United States Patent [19]

Falcone

[11] Patent Number: 6,093,495

[45] Date of Patent: *Jul. 25, 2000

[54] WATER SOLUBLE PERFLUORO POLYETHER SALT TOPCOAT LUBRICANTS

[75] Inventor: Samuel J. Falcone, San Jose, Calif.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/952,702

[22] PCT Filed: Aug. 9, 1996

[86] PCT No.: PCT/US96/12998

§ 371 Date: Oct. 29, 1997

§ 102(e) Date: Oct. 29, 1997

[87] PCT Pub. No.: WO98/07145

PCT Pub. Date: Feb. 19, 1998

[51] Int. Cl.[7] ........................................ B32B 27/00
[52] U.S. Cl. ............................... 428/422; 428/694 TP; 428/694 TF; 428/900; 427/131; 508/582; 508/583; 560/182; 568/615; 568/622; 528/488; 528/489

[58] Field of Search ........................ 428/65.4, 422, 428/694 TP, 694 TF, 900; 427/131; 508/582, 583; 560/182; 568/615, 622; 528/488, 489

[56] References Cited

U.S. PATENT DOCUMENTS

| | | | |
|---|---|---|---|
| 3,715,378 | 2/1973 | Sianesi | 260/463 |
| 4,786,544 | 11/1988 | Saito | 428/143 |
| 5,227,516 | 7/1993 | Takashi et al. | 560/182 |
| 5,508,061 | 4/1996 | Yanagisawa | 427/127 |
| 5,536,577 | 7/1996 | Murayama et al. | 428/408 |

FOREIGN PATENT DOCUMENTS

| | | |
|---|---|---|
| 0 519 406 | 12/1992 | European Pat. Off. . |
| 05 078 644 | 3/1993 | Japan . |
| 2 282 147 | 9/1994 | United Kingdom . |

*Primary Examiner*—Stevan A. Resan
*Attorney, Agent, or Firm*—McDermott, Will & Emery

[57] ABSTRACT

A water or aqueous soluble salt of a perfluoro polyether alcohol is applied to form a lubricant topcoat on a magnetic recording medium. Suitable soluble salts include the sodium salt of a perfluoro polyether diol.

19 Claims, 1 Drawing Sheet

WATER SOLUBLE PERFLUORO POLYETHER SALT TOPCOAT LUBRICANTS

TECHNICAL FIELD

The present invention relates to the recording, storage and reading of magnetic data, particularly rotatable magnetic recording media, such as thin film magnetic disks having textured surfaces and a lubricant topcoat for contact with cooperating magnetic transducer heads. The invention has particular applicability to a method for applying a lubricant topcoat to a magnetic recording medium.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective layer to prevent wear between the disk and head interface during drive operation. Excessive wear of the protective overcoat, typically comprising carbon, increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction. A conventional material employed for the lubricant topcoat comprises a perfluoro polyether (PFPE) which consists essentially of carbon, fluorine and oxygen atoms.

In view of the criticality of the lubricant topcoat, there is a continuing need for improved bonding of the lubricant to the protective carbon overcoat. Conventional practices to control the amount of bonding comprise thermally treating the lubricant and UV curing.

Conventional lubricant topcoats formed from PFPEs, comprise extremely non-polar molecules and, hence, exhibit solubility only in fluorinated solvents. Over the years, Freon® solvents have been conventionally employed in forming a lubricant topcoat on a magnetic recording medium. However, most Freons® have been found to pose a serious environmental hazard and, hence, have been banned in the United States. Current solvent replacements for Freon® solvents include perfluorinated hexanes which are extremely expensive.

Accordingly, there exists a need for lubricants which are readily soluble in non-expensive solvents, particularly aqueous solvents, such as water or aqueous alcohol solutions, and can be employed effectively as a lubricant topcoat on a magnetic recording medium.

DISCLOSURE OF THE INVENTION

An object of the present invention is a water and/or aqueous alcohol soluble lubricant that can be easily applied to a magnetic recording medium to form a lubricant topcoat with excellent friction and stiction characteristics.

A further object of the present invention is a method of manufacturing a water soluble lubricant for use as a lubricant topcoat in manufacturing a magnetic recording medium.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising a lubricant topcoat, wherein the lubricant is soluble in water, a lower alkanol or a solution of the alkanol and water.

Another aspect of the present invention is a water soluble lubricant comprising a salt of a perfluoro polyether compound having at least one hydroxyl group.

Yet another aspect of the present invention is a method of manufacturing a magnetic recording medium, which method comprises depositing a magnetic layer on a substrate and depositing a solution of a water soluble lubricant on the magnetic layer to form a lubricant topcoat.

A further aspect of the present invention is a method of making a water soluble perfluoro polyether alcohol, which method comprises mixing the perfluoro polyether alcohol with an alkali metal cation, an alkaline earth metal cation, a transition metal cation or organic cation to form a precipitate; washing the resulting precipitate with water; dissolving the washed precipitate in a solvent; and recovering the alkali metal, alkaline earth metal, transition metal or organic salt of the perfluoro polyether alcohol.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
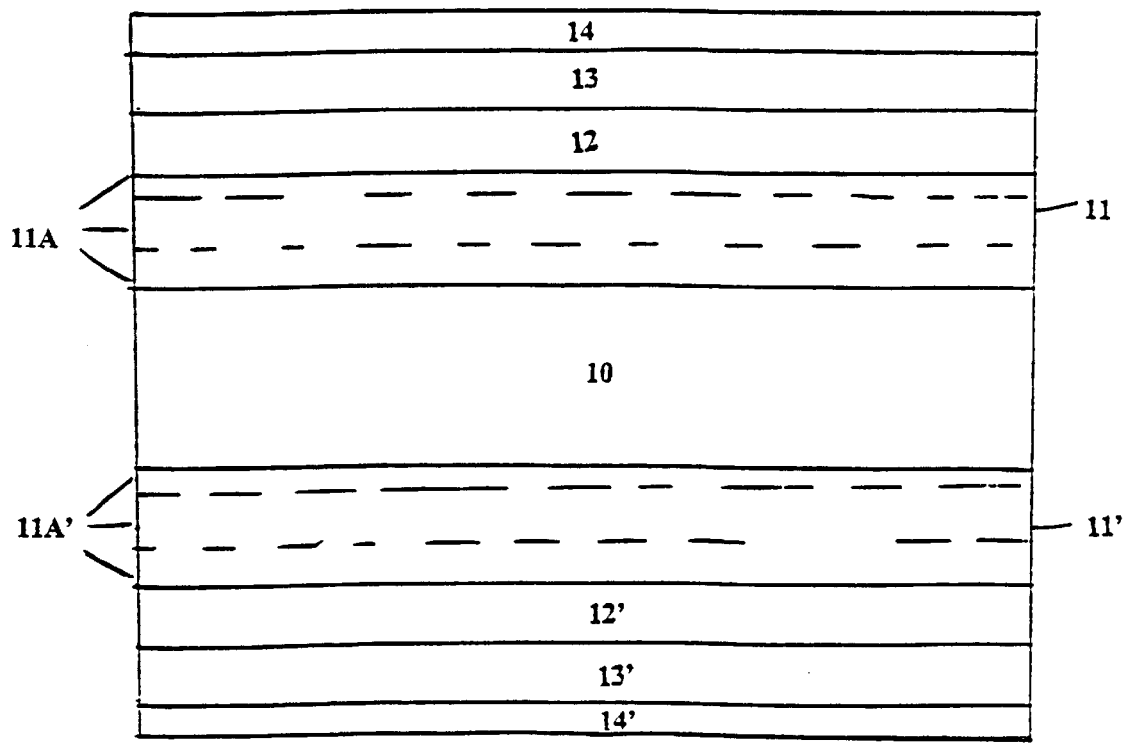
FIG. 1 schematically depicts a magnetic recording medium structure to which the present invention is applicable.

Conventional methods of manufacturing a magnetic recording medium comprise forming a lubricant topcoat by applying a lubricant dissolved in a fluorinated hydrocarbon, notably a perfluorinated hexane, with an attendant economic impact on manufacturing costs. Conventional techniques for forming a lubricant topcoat of a magnetic recording medium also comprise the use of emulsified fluorinated formulations, and a Langmuir-Blodgget technique wherein lubricant solutions in fluorinated solvents are placed on a disk with water. However, such conventional techniques disadvantageously require the use of a fluorinated solvent.

In accordance with the present invention, water and aqueous alcohol soluble lubricants are provided which can be easily applied in an inexpensive, time saving, convenient manner to form a lubricant topcoat on a magnetic recording medium. The present invention enables the formation of a lubricant topcoat by such cost effective techniques as dipping the magnetic recording medium in an aqueous solution of the lubricant, while avoiding the use of environmentally hazardous fluorinated solvents. Accordingly, a magnetic recording medium such as that depicted in FIG. 1 can be advantageously produced by a method wherein the lubricant topcoat 14 is applied as a solution of the lubricant in water and/or an aqueous alcohol and dried, as by heating.

The water soluble lubricant in accordance with the present invention comprises a salt of a perfluoro polyether compound having at least one hydroxyl group, e.g., alcohols such as diols. The inventive lubricant can be prepared by reacting a perfluoro polyether alcohol with a metal cation base, suitable organic cation or a basic metal as in any one of the following general reaction schemes:

$$PFPE-CH_2OH + M^+-OH^- \rightarrow PFPE-CH_2O^-M^+ + H_2O$$

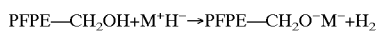

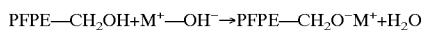

$$PFPE-CH_2OH + M^{+-}(CH_2HC_2CH_2CH_3) \rightarrow PFPE-CH_2O^-M^+ + CH_3CH_2CH_2CH_3$$

$$2PFPE-CH_2OH + 2M^0 \rightarrow 2PFPE-CH_2O^-M^+ + H_2$$

where M is an alkali metal, an alkaline earth metal, a transition metal or an organic cation.

It should be apparent to one skilled in the subject art that any perfluoro polyether alcohol can be employed in preparing the salt used in the practice of the present invention. Indeed, the PFPE in the above reaction may be of any type, including PFPE-1, PFPE-2, PFPE-3 and PFPE-4 (Del Pesco, Perfluoralkylpolyethers, CRC Handbook of Lubrication and Tribology, Vol. III, pp. 287–303, 1994, Booser, E. R. ed., CRC Press, Boca Raton, Fla.), with the proviso that there be at least one free hydroxyl group for the formation of a metal salt.

In this connection, as employed throughout the present disclosure, the product obtained from the reaction of the PFPE and a cation will be denominated as a "salt," although possibly not fitting the classical definition thereof. Furthermore, the perfluoro polyether alcohol is intended to include the corresponding compounds wherein the terminal methylene group(s) containing the hydroxyl, are not perfluorinated.

In addition to the above general structure, the perfluoro polyether may have more than one hydroxyl group for reaction with the cation. Thus, in an embodiment of the present invention, the perfluoro polyether is a linear polymer, such as PFPE-3 or PFPE-4, in which one or more hydroxyl groups are terminally located.

In accordance with the present invention, a conventional perfluoro polyether alcohol lubricant, such as ZDOL is modified in the above-reaction scheme with a metal cation to render the perfluoro polyether alcohol water soluble. ZDOL (Ausimont USA, Thorofare, N.J.) is a linear perfluoro polyether diol having the structure:

$$HOCH_2CF_2O-[CF_2\ CF_2O]-[CF_2O]-CF_2\ CH_2OH$$

wherein each of m and n is 0 or an integer of up to about 100. Thus, an embodiment of the present invention comprises a water soluble linear perfluoro polyether diol salt having the following structure:

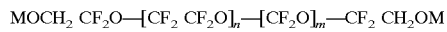

$$MOCH_2\ CF_2O-[CF_2\ CF_2O]_n-[CF_2O]_m-CF_2\ CH_2OM$$

wherein M is a cation of an alkali metal, an alkaline earth metal, a transition metal or an organic salt cation, and each of m and n is 0 or an integer of up to about 100.

ZDOL is available in various molecular weights ranging from over about 100 to about 10,000, prepared from commercial sources by fractionation, any of which may be employed in the practice of the present invention. In one embodiment of the present invention, an alcohol salt of ZDOL having an average molecular weight range of about 1,000 to about 5,000, such as 2,000, is formed.

Another commercially available perfluoro polyether alcohol which can be employed in the practice of the invention is Demnum® SA (Nagase & Co., Ltd), which has the following structure:

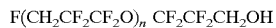

$$F(CH_2CF_2CF_2O)_n\ CF_2CF_2CH_2OH$$

wherein n is an integer of about 15 to about 100.

Demnum® SA is available in molecular weights ranging from about 1500 to about 8000, and with fractionation techniques, such as flash chromatography or distillation, molecular weights of about 100 to about 10,000 can be obtained. In another embodiment of the present invention, Demnum® SA having an average molecular weight from about 1000 to about 5000, such as about 2000, is employed.

In another embodiment of the present invention, a water and/or aqueous alcohol soluble PFPE lubricant is produced by adding a perfluoro polyether alcohol to an aqueous solution containing an excess of a basic source of alkali metal, alkaline earth metal, transition metal, or organic cation (e.g., quaternary ammonium, phosphonium, sulfonium, etc.), and mixing. In an aspect of this embodiment, mixing is performed by vigorously stirring to maximize yield in suitably short reaction times. Upon reaction with the metal or organic cation, the perfluoro polyether alcohol forms a precipitate that can be readily isolated by standard techniques as, for example, decanting, filtration, etc.

The isolated perfluoro polyether alcohol salt precipitate is then washed, as with deionized water, such as 8 mΩ water, to remove excess salt reagent. The washed precipitate is then dissolved in an alcohol, such as a $C_1$–$C_5$ alkanol, e.g., methanol, ethanol, propanol, isopropanol or butanol, and extracted repeatedly with an equal volume of Freon TF®, [Fluorinert®], or a perfluorinated hexane, or the like, to remove any unreacted perfluoro polyether alcohol. The alcohol extract containing the product PFPE—alcohol salt product is next passed over a celite column, as by gravity feed, and the solvent removed in vacuo. The recovered product, which is a white precipitate, may then be dissolved in a suitable predetermined concentration in an aqueous alcohol, such as a lower alkyl alcohol, e.g., methanol, ethanol, propanol, butanol, and the like. The recovered product is also soluble in the alcohol itself. In general, the PFPE alcohol salt solution is redissolved at a concentration in the range of from about 0.01 percent (w/v) to about 100 percent (w/v), such as from about 0.1 percent (w/v) to about 50 percent (w/v). In an embodiment of the present invention, the PFPE alcohol salt solution is redissolved at a concentration of from about 1 percent (w/v) to about 10 percent (w/v).

In practicing the present invention, a predetermined amount of the PFPE alcohol salt is diluted with water, e.g., deionized water, and/or an aqueous short-chain alcohol solution, to a desired working concentration. Generally, useful working concentrations of the PFPE alcohol salt in practicing the present invention range from about 0.0001 percent (w/v) to about 10 percent (w/v), such as from about 0.001 percent (w/v) to about 1 percent (w/v), e.g., from about 0.01 percent (w/v) to about 0.5 percent (w/v). In an embodiment of the present invention, the working concentration of the aqueous PFPE alcohol salt is about 0.1 percent (w/v) and the aqueous solution is heated to a temperature of from about 40° C. to about 100° C. and filtered using conventional techniques, prior to use.

The PFPE alcohol salt produced in accordance with the present invention can be applied to a magnetic recording medium by conventional techniques. For example, the working solution can be heated, as at a temperature of from about 50° C. to about 90° C. By the use of a lifter type dipper, a magnetic disk can be submerged in the lubricant solution and soaked for a time sufficient to coat the disk surface fully. It should be apparent to one skilled in the subject art, that the time required for forming the coating is dependent upon the solution concentration and temperature, as well as the properties of the particular PFPE alcohol salt. For example, it was found that a soaking time of about three minutes is sufficient to coat a disk surface using a 0.1 percent (w/v) solution of the sodium salt of ZDOL.

After sufficient coating time has elapsed, the disk is slowly removed from the lubricant solution, as at a speed in the range of from about 0.01 mm/sec to about 10.0 mm/sec, e.g., from about 0.1 mm/sec to about 1 mm/sec. The resulting disk has a lubricant coating of about 15 Å to 30 Å as measured by Fourier transform infrared spectroscopy (FT-IR). The coated disk may thereafter be dried if not already dry, as at an elevated temperature.

In another embodiment of the present invention, a disk is soaked for a time sufficient to form a coating thereon as described above, removed from the solution and wiped of excess lubricant solution, as by hand or machine wiping. In this embodiment, lower temperatures, such as about 20° C. to about 40° C., may be employed and the soaking time altered accordingly. The resulting disks contain a lubricant coating having a thickness in the range of about 5 Å to about 100 Å, depending on the lubricant solution formulation, concentration of lubricant in solution, temperature of the lubricant solution and the structure of the thin film disk.

Surfactants may be added to the lubricant solution of the present invention to enhance wetting of the thin film medium. Suitable conventional surfactants include FLUO-RAD® surfactants obtainable from 3M Company, although other known surfactants can be employed. Surfactants are particularly useful in the low temperature application/wipe embodiment previously described.

In another embodiment of the present invention, the wettability of the disk surface is enhanced to facilitate and improve the adherence and formation of the lubricant topcoat. For example, the disk surface can be oxidized in a conventional manner, as by plasma etching, to provide a more hydrophilic surface, thereby enhancing wettability.

Lubricant topcoats on magnetic recording media formed in accordance with the present invention have been evaluated with respect to static stiction, 1 RPM stiction and SD-CSS performance on thin film and magnetic recording disks, with results as good or better than lubricants in current use, such as AM2001 (Ausimont USA). Moreover, the PFPE alcohol salt lubricants in accordance with the present invention advantageously enable the use of a markedly less expensive solvent system for application to form a lubricant topcoat. Additionally, the present invention provides excellent lubricant films without the environmental risks attendant upon employing conventional perfluorinated hydrocarbons, and are less demanding on workers.

EXAMPLE 1

In an erlenmeyer flask, 10 milliliters of ZDOL 2,000, commercially available from Ausimont, were vigorously mixed with a stirring rod with 30 milliliters of 50% sodium hydroxide solution. A voluminous white precipitate formed, and stirring was continued by hand for five minutes. Excess sodium hydroxide solution was decanted and the white precipitate washed five times with deionized water. The white precipitate was then dissolved in 300 milliliters of methanol and extracted five times with Freon TF® to remove any unreacted ZDOL. The methanol layer was filtered through celite by gravity and removed in vacuo to yield 12 grams of ZDONa as a white solid. The resulting white solid, ZDONa, was found to be soluble in methanol, isopropanol, water and aqueous alcohol solutions, but insoluble in Freons®, hexane, methylene chloride, acetone and perfluorinated hexane.

A lubricant solution for forming a lubricant topcoat on a magnetic recording medium can be formed by simply dissolving a PFPE alcohol salt produced in accordance with the present invention in an alcohol to produce a solution and diluting the solution with water.

EXAMPLE 2

Five grams of ZDONa were dissolved with heating in 10 milliliters of methanol. The resulting methanolic solution was diluted to 1 liter with deionized water. The solution was then heated at 60° to 80° C. and filtered through cotton filter paper. The resulting solution can be employed to form a lubricant topcoat on a magnetic recording medium.

EXAMPLE 3

The procedure of Example 2 was followed, except that ultrasonic energy was used to form the solution of ZDONa in 10 milliliters of methanol.

Advantageously, the water soluble lubricant solutions prepared in accordance with the present invention can easily be applied to a magnetic recording medium as, for example, to form lubricant topcoat 14 in the magnetic recording medium depicted in FIG. 1. In accordance with the present invention, the lubricant topcoat can be advantageously applied by submerging a disk in the lubricant solution for a sufficient period of time to form a lubricant topcoat on the disk and removing excess lubricant, as by hand wiping. Elevated temperatures are not necessary. However, it has been found convenient to form the lubricant topcoat at an elevated temperature.

EXAMPLE 4

The ZDONa lubricant solution prepared in accordance with Example 2 was heated to a temperature of about 50° to about 90° C. Using a lifter-type dipper, a disk was submerged in the lubricant solution, soaked for three minutes, and slowly removed from the solution at a rate of 0.1 millimeter/second—1.0 millimeter/second. The resulting disk was found to be free from water stains and had a uniform lubricant coating of about 15 Å to about 30 Å measured by FT-IR (Fourier Transform Infrared Spectroscopy). The 1 rpm stiction and SD-CSS performance for thin film disks, lubricated with ZDONa in accordance with this Example at a lubricant thickness of 10–11 Å 21–26 Å, were tested and found to perform as well as or better than AM2001, a conventional lubricant marketed by Ausimont.

As one skilled in this art should appreciate, the lubricant coating thickness depends upon the particular lubricant solution formulation, concentration of lubricant in solution, temperature of the lubricant solution and the structure of the thin film disk. One skilled in this art can easily adjust the relevant process parameters to obtain a desired lubricant coating thickness.

As previously disclosed, the lubricant solution in accordance with the present invention can be applied at elevated temperatures by hand wiping or mechanical wiping techniques after immersing a disk in a lubricant solution. A disk ready for application of a lubricant topcoat is soaked in the lubricant solution, removed from the solution and hand or machine wiped, as with a clean cotton wipe. In this manner, a lubricant thickness ranging from about 10 Å to about 100 Å can be obtained depending upon the formulation and wipe procedure.

The present invention is not limited to ZDOL® alcohol salts. Rather, a variety of PFPE alcohols are commercially available and will undergo the disclosed salt transformation rendering them similarly useful. For example, Nagase's Demnum® SA PFPE alcohol, which is available at a molecular weight of about 1,500 to about 8,000, can be employed in the present invention. In an embodiment of the present invention, Demnum SA® alcohols having a molecular weight in the range of about 1,000 to about 5,000 have been successfully employed.

The PFPE alcohol salts in accordance with the present invention are not limited to sodium. Rather, any alkali metal cation, such as lithium, sodium, potassium, cesium and rubidium, can be conveniently employed. In addition, various alkaline earth metal cations, such as beryllium, magnesium, calcium, strontium and barium, can be employed to form a water soluble PFPE alcohol salt. In addition, various transition metal cations can also be employed, as well as organic cations, such a quaternary ammonium ($R_4N^+$), sulphonium ($R_3S^+$) and phosphonium cations, and the like.

The present invention is not limited to any particular type of magnetic recording medium, but can be employed in any of various magnetic recording media, including those wherein the substrate or a subsequently deposited layer has been textured, as by mechanical treatment or laser techniques, and the textured surface substantially reproduced on subsequently deposited layers. Thus, a lubricant prepared in accordance with the present invention, can be applied to form a topcoat, such as topcoat 14 on the magnetic recording media depicted in FIG. 1, but not necessarily limited thereto.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising:
   a substrate;
   a magnetic layer on the substrate;
   a protective overcoat having a surface on the magnetic layer; and
   a lubricant topcoat on said protective overcoat surface, wherein the lubricant topcoat consists essentially of a salt of a fluoro polyether alcohol lubricant compound directly in contact with said protective overcoat surface.

2. The magnetic recording medium according to claim 1, wherein the lubricant topcoat consists of the salt of the fluoro polyether alcohol lubricant compound applied directly in contact with said protective overcoat surface from a solution consisting essentially of said salt in a solvent selected from the group consisting of water, a lower alkanol, and a mixture thereof.

3. The magnetic recording medium according to claim 1, wherein said fluoro polyether alcohol is a perfluoro polyether alcohol.

4. The magnetic recording medium according to claim 1, wherein the lubricant topcoat consists of a di-salt of a diol lubricant compound.

5. The magnetic recording medium according to claim 1, wherein the lubricant topcoat is a sodium salt of a perfluoro polyether diol lubricant compound.

6. The magnetic recording medium according to claim 1, wherein the lubricant topcoat consists of a linear perfluoro polyether diol salt having the following formula:

$$MOCH_2CF_2O—(CF_2CF_2O)n—(CF_2O)m\text{-}CF_2CH_2OM$$

wherein M is a cation of an alkali metal, an alkaline earth metal, a transition metal or an organic salt cation, and each of m and n is 0 or an integer of up to about 100.

7. The magnetic recording medium according to claim 1, wherein the protective overcoat comprises carbon.

8. A lubricant solution consisting essentially of:
a solvent selected from the group consisting of lower alkonols, water, and mixtures thereof; and
a di-salt of a perfluoro polyether diot lubricant compound dissolved therein.

9. The lubricant solution according to claim 8, wherein the di-salt of a perfluoro polyether diol lubricant compound has the following structure:

MOCH$_2$CF$_2$O—(CF$_2$CF$_2$O)n—(CF$_2$O)m—CF$_2$CH$_2$OM wherein M is a cation of an alkali metal, an alkaline earth metal, a transition metal or an organic salt cation, and each of m and n is 0 or an integer of up to about 100.

10. The lubricant solution according to claim 8, wherein the di-salt of a perfluoro polyether diol lubricant compound has an average molecular weight of about 1000 to about 5000.

11. The lubricant solution according to claim 8, wherein the di-salt of a perfluoro polyether diol lubricant compound is the disodium salt of a linear perfluoro polyether diol.

12. The lubricant solution according to claim 8, wherein the di-salt of a perfluoro polyether diol lubricant compound is dissolved in a solution of the lower alkanol and water.

13. The lubricant solution according to claim 8, wherein the di-salt of a perfluoro polyether diol lubricant compound is dissolved in water.

14. A method of manufacturing a magnetic recording medium, which method comprises the sequential steps of:
forming a magnetic layer on a substrate;
forming a protective overcoat layer over the magnetic layer; and
forming a lubricant topcoat on the surface of the protective overcoat layer by directly applying to said surface a solution consisting essentially of:
a solvent selected from the group consisting of lower alkonols, water, and mixtures thereof; and
a salt of a fluoro polyether alcohol lubricant compound dissolved therein.

15. The method according to claim 14, wherein the salt is a salt of a perfluoro polyether alcohol.

16. The method according to claim 15, wherein the salt is a salt of a perfluoro polyether alcohol with the cation of an alkali metal, an alkaline earth metal, a transition metal or an organic salt.

17. The method according to claim 15, wherein the salt is a linear perfluoro polyether diol salt having the following structure:

MOCH$_2$ CF$_2$O—[CF$_2$ CF$_2$O]$_n$—[CF$_2$O]$_m$—CF$_2$ CH$_2$OM wherein M is a cation of an alkali metal, an alkaline earth metal, a transition metal or an organic salt cation, and each of m and n is 0 or an integer of up to about 100.

18. The method according to claim 14, wherein the substrate comprising the magnetic layer and protective overcoat is submerged in the solution, soaked, and slowly withdrawn and dried.

19. The method according to claim 18, wherein the solution is at a temperature of about 50° C. to about 90° C.

* * * * *